Jan. 7, 1969

NAI YUEN CHEN 3,420,770

CATALYTIC CRACKING OF HYDROCARBONS

Filed Sept. 28, 1966

INVENTOR
NAI Y. CHEN

BY Oswald G. Hayes
ATTORNEY

United States Patent Office 3,420,770
Patented Jan. 7, 1969

3,420,770
CATALYTIC CRACKING OF HYDROCARBONS
Nai Yuen Chen, Cherry Hill, N.J., assignor to Mobil Oil
Corporation, a corporation of New York
Filed Sept. 28, 1966, Ser. No. 582,584
U.S. Cl. 208—120      7 Claims
Int. Cl. C10g 37/00

ABSTRACT OF THE DISCLOSURE

This disclosure is concerned with a novel process for converting hydrocarbons which comprises contacting a feed material with a cracking catalyst having an alpha value greater than 0.5 at average reaction temperatures ranging from minimum 1100° F. to a practical maximum of about 1350° F. at a minimum space velocity (LHSV) of 32 at 1100° F. to about 1200 at 1350° F. and a maximum cat.-oil ratio of about 0.1 and, more preferably, 0.01.

---

Figure 1:
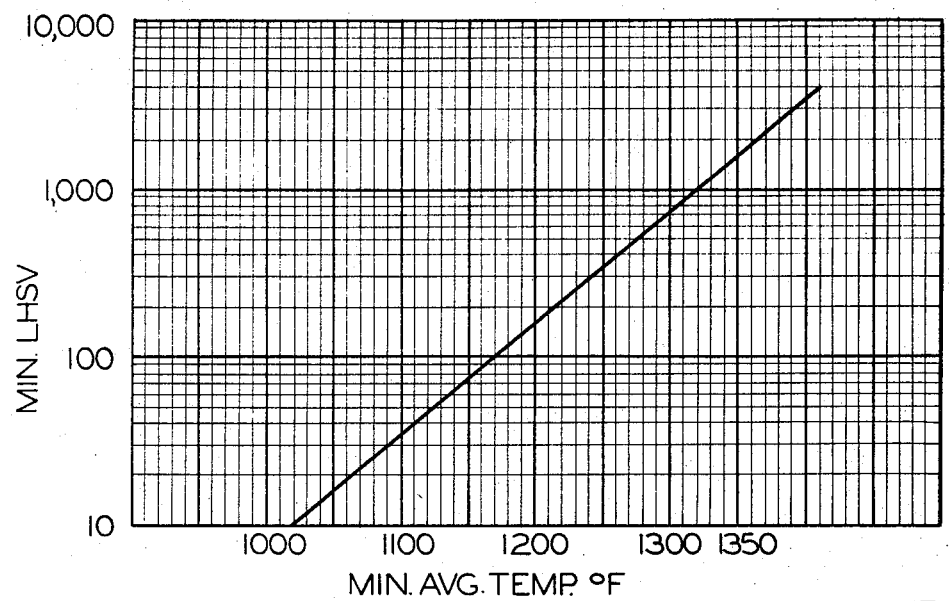

This invention relates to the catalytic conversion of hydrocarbon oils into lower normally liquid and normally gaseous products. More particularly, the present invention is directed to a process wherein a high boiling hydrocarbon or hydrocarbon mixture, for example, a petroleum fraction is subjected to cracking under very unusual conditions.

The novel process of this invention is so revolutionary in nature that it must have a very pronounced effect on the entire oil industry. This invention will necessitate a reevaluation of commercial cracking installations since it defies principles heretofore held sacred by commercial cracking designers.

The cracking of hydrocarbons to produce lower boiling hydrocarbons, in particular, hydrocarbons boiling in the motor fuel range is an operation upon which a vast amount of time and effort has been spent in view of its tremendous commercial significance. The cracking of gas oil has been carried out thermally and catalytically in a fixed bed, moving bed, and fluidized bed. The catalysts suggested for catalytic cracking have included a wide variety of materials, such as silica-alumina, silica-magnesia, silica-zirconia, silica-boria, silica-titania, fluoride or fluoroborates on silica-alumina or alumina-carriers, acid treated clays, pumice, homogeneous catalysts including halogen and aluminum chloride and quite recently, aluminosilicate compositions generally referred to as zeolites.

Although certain of the aluminosilicate compositions are very effective hydrocarbon conversion catalysts possessing orders of magnitude of activity up to many million times that of conventional silica-alumina catalysts, nevertheless, the use of these catalysts in commercial operations has been generally carried out under conventional cracking conditions.

One common characteristic of all the commercial cracking operations, irrespective of the particular catalyst being employed, is that they are all cyclic processes, i.e., a catalyst material is used to affect cracking and is thereafter regenerated. During the course of the cracking process, some of the oil vapor charge is cracked to heavy hydrocarbonaceous materials. This hydrocarbon residue known as "coke" forms a refractory coating on the catalyst and fouls it. The deposition of coke on the catalyst tends to deactivate it and thereby reduces its efficiency for the cracking of gas oil. In order to rejuvenate the catalyst, additional steps are included in commercial cracking processes whereby much of the carbonaceous residue is removed from the catalyst by burning it, thereby reactivating or regenerating the catalyst and permitting it to be reused in the subsequent cracking cycle.

Although the operating particulars of the regeneration steps vary from process to process, it can generally be stated that a typical procedure would include withdrawing the spent catalyst from the reaction zone and contacting it with an oxygen-containing gas at elevated temperatures in order to remove the coke by burning. The burning of the coke is carried out in a piece of equipment which is generally referred to as a kiln. In conventional operations, coke formation limits productivity of a catalyst to the conversion of one pound of oil over approximately one to four pounds of catalyst after which catalyst must be regenerated.

It can generally be started that a kiln is a rather expensive piece of equipment and it contributes substantially to the cost of providing a commercial cracking installation. Additionally, and perhaps even more significantly, most catalytic cracking reactors are "kiln limited." By "kiln limited" it is meant that the capacity of the cracker cannot be utilized to its maximum since a portion of the catalyst must always be regenerated and this regeneration is carried out in a kiln which does not accomplish the desired result as quickly as is necessary. Therefore, in many cases, the reactor must "wait" until the kiln has completed its work before it can start to function again.

In an attempt to solve the problem of coke formation, the prior art has resorted to a wide variety of techniques, none of which have been completely successful in eliminating the overall problem. Although a wide variety of materials have been tested as catalysts for the conversion of gas oil into gasoline with a concomitant reduction in the amount of coke formed, nevertheless, the basic problem facing the oil industry has not been solved, i.e., it has always been necessary to have a cyclic process which included both a conversion step and a regeneration step.

One interesting observation which has long been known to the prior art is that the amount of coke which is formed by any given catalyst can generally be stated to slowly decline with increasing temperature of reaction. Thus, for example, the workers of the prior art are well aware of the fact that if a silica-alumina catalyst was employed for cracking at 900° F., more coke would be obtained than if the same catalyst was employed at 1000° F. However, when high temperatures were employed a corresponding increase in light gases and hydrogen was encountered along with the expected reduction in coke. The formation of light gases in increasing quantities reduced the amount of charge converted to products boiling in the gasoline range. Therefore, it can be seen that although the problem of coke formation is indeed a serious one it is not, in and of itself, the entire answer to the problem of converting a hydrocarbon oil to produce gasoline. It should be immediately realized that a successful solution to the overall problem dictates a low formation of coke accompanied by a high production of gasoline all at a reasonable level of conversion.

Accordingly, it is the primary object of this invention to provide a novel process for the conversion of gas oil into products boiling within the motor fuel range, said process being characterized by a high degree of selectivity towards gasoline and accompanied by an extremely low formation of coke.

It is still another object of this invention to provide a novel process for the catalytic cracking of gas oil into gasoline, said process being characterized by the fact that it does not require any regeneration of the catalyst, i.e., the catalyst can be discarded after conversion.

It should become immediately obvious that this invention is more than just an improvement in conventional processes for producing gasoline but rather, represents a tremendous leap forward in an area of technology heretofore comparatively unexplored. It should also be realized that a catalytic cracking process which enables the catalyst to be discarded represents a tremendous economic advantage over the cracking processes heretofore practiced. Immediate obvious advantages of such an operation would include a lower initial cost for providing a commercial cracking installation since a kiln for the regeneration of a catalyst would be unnecessary. Another important advantage would be the fact that all the reactors could be operated to their maximum potential since they would not be dependent upon a kiln for regeneration of a portion of a catalyst used therein.

The novel process of this invention is carried out by contacting a feed material with a cracking catalyst at an average reaction temperature ranging from minimum 1100° F. up to a practical maximum of about 1350° F. at a minimum space velocity (LHSV) of 32 at 1100° to about 1200 at 1350°° F., and a maximum cat./oil ratio of about 0.1 and more preferably 0.01.

Although the above clearly sets forth the parameters of the operating conditions of this invention, it is believed that a certain amount of discussion will be helpful in order to fully understand the instant invention.

As can be seen from the minimum temperature of 1100° F. which is employed in the instant process, it generally can be stated that thermal cracking temperatures are being employed. As has heretofore been stated, it has long been known that high temperatures will, in fact, produce a minimum amount of coke, but unfortunately at these high temperatures the heretofore practiced processes produced an inordinate amount of light gases, thereby detracting from the overall yield of gasoline.

It should also be obvious that, if in fact, thermal cracking conditions of the prior art were employed then, irrespective of what catalyst was being used, no useful result would be obtained, i.e., if conditions were used which would, in and of themselves, produce a high amount of light gases without any catalyst then the inclusion of a catalyst at those conditions could do no more than aggravate an already bad situation.

Therefore, although the instant process is carried out at temperatures well within the range of thermal cracking, it is performed at space velocities such that thermal cracking is minimized. Thus, it can be seen that the novel process of this invention operates at conditions of temperature and space velocity which are such that thermal cracking is minimized. It should be immediately stressed that this is an extremely key point in the novel process of this invention. As has heretofore been stated, if thermal cracking conditions are employed then the presence or absence of the catalyst would have very little effect on the overall product distribution. Thus, it is absolutely mandatory that thermal cracking be minimized and this invention employs a combination of temperatures and space velocities such that a maximum of 10% thermal cracking is all that is obtained. In this regard, reference is made to FIGURE 1 which is a graph representing a plot of the temperature and minimum space velocity found to insure no more than 10% thermal conversion. As can be seen there is a definite critical space velocity for each individual temperature in order to insure that these conditions are maintained.

It is found that in order for the catalyst to be able to effect a substantial conversion at these rather drastic conditions of space velocity, it must, in spite of the prevailing high temperature, have a high activity. In this regard it has been found that a catalyst must be employed which has an $\alpha$ value of at least .5 and preferably from about 3 to about 25. The $\alpha$ value describes the relative activity of the catalyst with respect to a high activity conventional silica-alumina cracking catalyst. Thus, an $\alpha$ value of 50 indicated an activity which is 50 times greater than the conventional reference catalyst.

To determine the $\alpha$ value n-hexane conversion is determined and converted to a rate constant per unit volume of catalyst and compared with that of a silica-alumina catalyst which is normalized to a reference activity of 1.0 at 1000° F.; catalytic activity of the catalysts are then expressed as multiple of this standard, i.e., the silica-alumina standard. The silica-alumina reference catalyst contains about 10 weight percent $Al_2O_3$ and the remainder $SiO_2$. This method of determining $\alpha$ is more fully described in "Journal of Catalysis," vol. IV, No. 4, August 1965, pages 527–529.

Representative of cracking catalyst which have a value of at least 0.5 and more preferably of at least 3 include certain types of silica-alumina, silica-magnesia, silica-zirconia and zirconia-alumina and more preferably crystalline alumino-silicate zeolites.

Aluminosilicates which are operable in the novel process of this invention include a wide variety of compounds, both natural and synthetic. Aluminosilicates can be described as a three-dimensional framework of $SiO_4$ and $AlO_4$ tetrahedra in which the tetrahedra are cross-linked by the sharing of oxygen atoms whereby the ratio of total aluminum and silicon atoms to oxygen atoms is 1:2. The hydrated form aluminosilicates may be represented by the formula:

$$M_{2/n}O:Al_2O_3:WSiO_2:yH_2O$$ 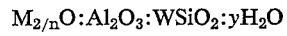

wherein M represents at least one cation which balances the electrovalence of the tetrahedra, $n$ represents the valence of the cation, $w$ the moles of $SiO_2$ and $y$ the moles of $H_2O$. The cation can be any or more of a number of metal ions depending whether the aluminosilicate is synthesized or occurs naturally. All or a portion of the cations originally associated with the aluminosilicate can be replaced with hydrogen ions, ammonium ions or other metal cations such as, for example, rare earth, calcium, manganese, magnesium, cobalt, etc. or mixtures thereof. It is to be noted that the replacing cations or mixtures of cations need only be present in an amount sufficient to give the aluminosilicate composition an $\alpha$ value of at least 0.5 and, more preferably, from 3 to 25.

Aluminosilicates falling within the above formula are well known and include synthesized aluminosilicates, natural aluminosilicates, and certain caustic treated clays. Among the preferred aluminosilicates one can include Zeolites A, Y, L, D, R, S, T, Z, E, F, Q, B, X, ZK–4, ZK–5 and Zeolite $\alpha$. Natural materials would include levynite, dachiarite, erionite, clinoptilolite, faujasite, analcite, paulingite, noselite, phillipsite, brewsterite, flakite, datolite, chabazite, gmelinite, leucite, scapolite, mordenite as well as those derived from certain caustic treated clays such as montmorillonite and kaolin families. The particularly preferred aluminosilicates are those having pore diameters of at least about 6 Angstroms.

It should also be stated that since the $\alpha$ value of a particular aluminosilicate increases with decreasing alkali metal ion content this invention specifically includes those aluminosilicates which have an extraordinarily high $\alpha$ value as a result of replacement of a substantial portion of the alkali metal cations with protons, other metal cations or mixtures thereof. One embodiment of this invention also resides in employing those high $\alpha$ value aluminosilicates and pretreating them in order to reduce the high $\alpha$ to the preferred $\alpha$ range of 3 to 25.

The $\alpha$ value of an aluminosilicate can be reduced by many techniques including heat treatment, steaming as well as a combination of both these techniques. Reduction of $\alpha$ by heat treatment can be accomplished by heating the aluminosilicate at temperatures of at least about 1500° F. for 1 to 48 hours or longer. Steaming to reduce $\alpha$ values can be carried out at elevated temperatures of 800° F. to 1500° F. and preferably at temperatures of about 1000° F. to 1400° F. The treatment may be accomplished in an atmosphere of 100% steam or in an atmosphere consisting of steam and gas which is substantially inert to the aluminosilicate. A similar treatment can be accomplished at lower temperatures in elevated pressures, e.g., 350° F. to 700° F. at 10 to about 200 atmospheres.

It should also be noted in view of the fact that one aspect of this invention resides in the development of a process which does not require regeneration of a catalyst that other types of aluminosilicates can be used which have heretofore been thought to be impractical. Thus, for example, aside from the question of activity, a catalyst in a regenerative process must also be stable to steam since, in fact, steam is used in the regenerative operations. In view of this, high sodium content aluminosilicates, i.e., the sodium faujasites of the X and Y type were generally thought to be unsuitable for cracking processes due to their lack of steam stability. In view of the fact that regeneration is not absolutely necessary in the instant invention, steam stability is also not necessary and high sodium content aluminosilicates can be employed.

As has heretofore been stated, the novel process of this invention is carried out by contacting a hydrocarbon with a cracking catalyst at temperatures ranging from 1100 to 1350° F. at certain critical minimum space velocity. It is to be understood that all figures given for space velocity refer to a charge that is 100% hydrocarbon, i.e., no diluent gas is added.

It is specifically pointed out that this invention also includes mixing a hydrocarbon charge with a diluent and passing said mixture over the catalyst. In situations where a feed is employed which is not 100% hydrocarbon then the space velocities must be chosen so as to insure that the previously set forth minimums will be applicable to the hydrocarbon portion of the feed. Thus, for example, it has been stated that for conversion at 1100° F. a minimum space velocity of 32 (LHSV) must be employed in order to insure that no more than 10% thermal cracking will be obtained. If, however, the hydrocarbon feed employed for conversion at 1100° F. is not all hydrocarbon, but rather, a mixture of a hydrocarbon with a gas such as hydrogen or helium then the minimum space velocity which is employed is merely the space velocity previously set forth multiplied by the fraction of the hydrocarbon in the feed. By way of specific illustration at 1100° F. a minimum space velocity of 32 is necessary for a feed which is 100% hydrocarbon. If, however, a feed which is employed which is 50% hydrocarbon and 50% hydrogen then the minimum space velocity employed would merely be ½ of 32 or 16. It should be immediately apparent that a 16 space velocity based on a 50–50 mixture of hydrocarbon and diluent is, in fact, equivalent to a 32 space velocity based on 100% pure hydrocarbon.

As will become more evident from the specific working examples, the process of this invention results in the production of a high yield of gasoline and insignificant amount of coke. While not wishing to be bound by any theory of operation, nevertheless, it appears that by using temperatures in excess of 1100° F. the thermodynamics of the cracking reaction are such that coke formation is minimized. As has heretofore been stated, the relationship between temperature and coke formation has long been known by the workers of the prior art. However, all the prior art work in this area had been carried out at space velocities such that thermal cracking was pronounced thereby masking any catalyst effect of the candidate material being tested. By operating at the conditions of high space velocity and high temperature, the instant invention results in a process which produces gasoline at good yields with good selectivity and also results in minimizing coke.

It is immediately apparent that if, in fact, coke formation is minimized then the catalyst is able to stay active for longer periods of time. Quite obviously, if the catalyst maintains its activity for a longer period of time, it is capable of doing more work, i.e., it can convert more hydrocarbons to gasoline. It is precisely this relationship which is expressed by the mathamatical expression—cat./oil ratio. As has previously been stated in the conventional operation, coke formation limits the productivity of a catalyst to the conversion of a pound of oil over approximately one to four pounds of catalyst after which the catalyst must be regenerated. As can be seen, the lower the cat./oil ratio, the more work the catalysts can do, i.e., the more pounds of oil it can process per pound of catalyst. This invention is concerned with a process which at its very minimum allows the treatment of 10 pounds of gas oil per pound of catalyst and, as will be seen in the working examples, the process of this invention allows the treatment of many thousands of pounds of gas oil per pound of catalyst. In fact, the process of this invention allows such a high degree of conversion of hydrocarbons to gasoline per unit weight of catalyst that it is possible to equal or better commercial operating conditions of competing refineries.

As has heretofore been stated, all present commercial cracking operations involve a cyclic operation, i.e., the catalyst is used for conversion and is thereafter regenerated. It should be apparent that this cycle cannot be carried on indefinitely and sooner or later a point is reached where the catalyst must be discarded either because its physical structure has been destroyed, because of attrition and/or or its activity is so impaired that no amount of burning or regenerating can restore it to a desirable or acceptable level. The process of this invention allows a hydrocarbon charge to be converted with such little coke formation that the catalyst can be used until it is spent and thereafter discarded. The amount of work performed by the catalyst will be almost equivalent to the amount of work performed by a prior art catalyst which has been regenerated time and time again.

It is to be completely understood, however, that this invention specifically includes the additional step of regenerating a catalyst if such is desired. Quite obviously, the spent catalyst of this invention also can be freed from carbonaceous deposits by the process of air regeneration if such is desired.

The novel process of this invention is applicable to a wide variety of feed materials including, but not limited to, those feed stocks employed in commercial refineries. However, maximum benefit is obtained from the instant process if a feed stock is chosen such that a proper carbon hydrogen balance is obtained. By way of very considerable oversimplification, it should be realized that a cracking process involves the redistribution or rearrangement of carbon and hydrogen, and in order to produce desired products there must be a sufficient amount of carbon and hydrogen originally present in the feed. If a feed stock is chosen which is "hydrogen deficient" then the maximum yield of useful products is governed by stoichiometric considerations. Thus, particularly preferred feed stocks are those which have hydrogen contents at least 12.3 wt. percent and even more desirably of at least 12.8 wt. percent.

It is to be understood that feed materials outside the range of desired hydrogen content, can be hydrotreated or hydrogenated prior to being cracked in accordance with the instant invention. Thus, for example, it is possible to start with a hydrogen-deficient, a Mid-Continent Gas Oil; treat it with hydrogen and thereafter subject the treated oil to cracking in accordance with this instant invention.

A particularly preferred embodiment of the novel process of this invention resides in the use of a combination process involving both hydrogenation and high temperature cracking when employing a feed material whose total hydrogen content is below the preferred minimum of 12.3 weight percent. In this connection, FIGURE 2 illustrates in schematic form, a typical flow sheet for carrying out a combination process.

Figure 2:
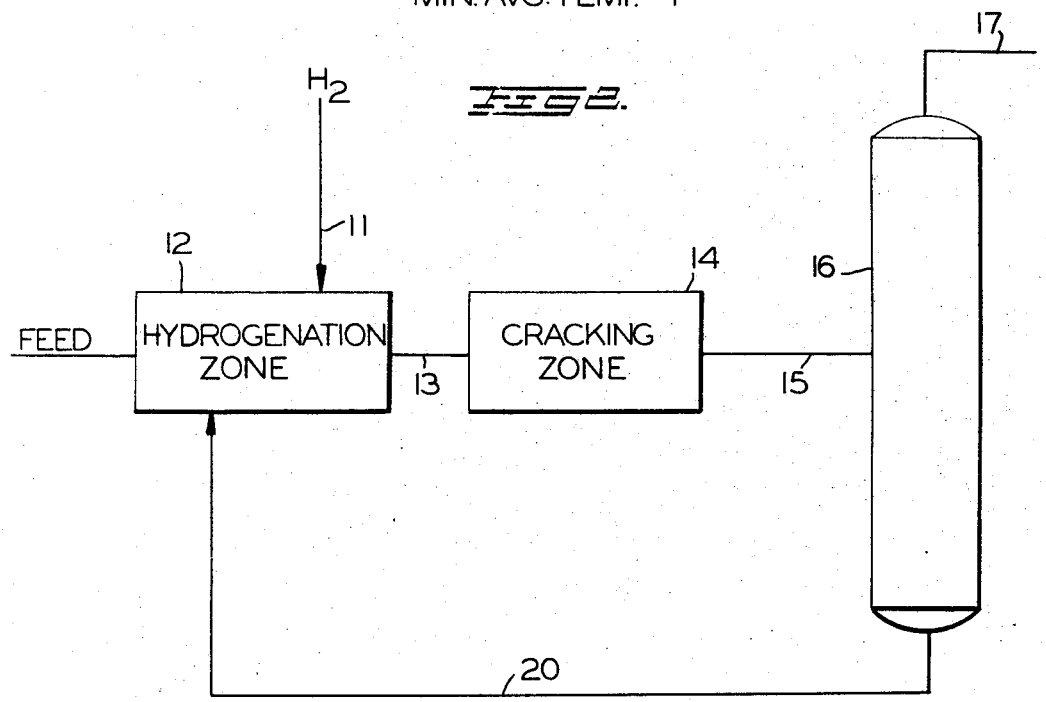

Referring more particularly to FIGURE 2, a hydrocarbon mixture not possessing the desired hydrogen content is conducted through line 10 into a hydrogenation zone 12 into which hydrogen is conducted through line 11. The hydrogenation zone contains a suitable hydrogenation catalyst and is maintained under hydrogenation conditions. The resulting hydrogenated feed material is conducted through line 13 into the high temperature cracking zone 14 and is thereafter cracked in accordance with conditions of high temperature and space velocity previously set forth.

The products resulting from cracking are removed through line 15 to fractionator 16 wherein products are collected overhead through outlet 17. The heavier liquid products are removed as bottoms from fractionator 16 and are conducted through lines 19 and 20 back to the hydrogenation zone wherein they are re-blended with the feed material and the resulting mixtures subject to hydrogenation conditions to increase the hydrogen content.

The following examples will illustrate the best mode now contemplated for carrying out this invention.

Examples 1–3

A mixture of helium and a Light East Texas Gas Oil (LETGO) having a hydrogen content of 13.05 percent by weight was preheated to 900° F. and thereafter charged into a reactor maintained at elevated temperatures in order to effect conversion of the gas oil. After five minutes the products were analyzed and the results of the analysis as well as the specific experimental conditions are shown in Table I.

TABLE 1

|  | Example I | Example II | Example III |
|---|---|---|---|
| Catalyst | None | None | None |
| Charge rates per minute: |  |  |  |
| Gas oil, g | 0.423 | 0.423 | 0.423 |
| He, cc | 420 | 420 | 140 |
| Average temperature, ° F | 1,062 | 1,255 | 1,150 |
| Vapor contact time | 0.008 | 0.008 | 0.023 |
| Conversion, wt. percent | 2.1 | 2.9 | 2.3 |

From the above 3 experiments, it can be seen that even at high reaction temperatures little conversion was obtained at the high space velocities employed. In these experiments the effect of thermal cracking has been minimized due to the novel combination of high temperature and high space velocities.

In all the examples which follow, unless otherwise indicated, prior to each individual catalyst being evaluated for cracking, it was calcined at the reaction temperature for 30 minutes with a 50/10 cc. per minute flow rate of a helium/oxygen mixture after which the reactor was purged with helium at a flow rate of 50 cc. per minute for 20 minutes.

Example 4

A mixture of helium and LETGO having a hydrogen content of 13.05 wt. percent was preheated to 900° F. and thereafter charged into a reactor containing 0.0427 grams of a synthetic crystalline aluminosilicate identified as Zeolite 13X which had been prepared in accordance with the following procedure.

A stream comprising a 30 percent by weight slurry of a crystalline aluminosilicate identified as 13X was contacted with a stream containing 5 percent by weight aqueous solution $RECl_3 \cdot 6H_2O$ at 180° F. for a period of time until the total rare earth chloride solution employed was one which amounted to 0.85 pound of $RECl_3 \cdot 6H_2O$ per pound of 13X. The resulting material was washed with water until the effluent was substantially free of chloride ions and then dried. The analysis of the material at this point was sodium (determined as sodium oxide) 1.3 weight percent and rare earth (determined as $RE_2O_3$) 26.5 weight percent.

The material prepared in the above matter was calcined in air for two hours at 900° F. and thereafter recontacted with a rare earth $RECl_3 \cdot 6H_2O$ solution containing 11.8 grams of $RECl_3 \cdot 6H_2O$ at room temperature for two hours. The material was then washed free of chloride ions, dried at 230° F. and calcined for an additional two hours at 200° F. The catalyst was then recontacted with the same rare earth chloride solution and again subjected to washing, drying and calcining steps to yield a rare earth containing crystalline aluminosilicate for a sodium content of 0.05%.

The above crystalline aluminosilicate was then steamed for 24 hours at 1200° F. with steam at 15 p.s.i.g. to yield a catalyst composition for an $\alpha$ value greater than 2.0.

The reactor was maintained at an average temperature of 1257° F. and for a run duration of five minutes the products were collected and analyzed. The results of the conversion as well as specific operating conditions are shown in Table 2.

TABLE 2

| | |
|---|---|
| Volume of catalyst, cc. | 0.070 |
| Weight of catalyst, gm. | .042 |
| Charge rates per minute |  |
| gas oil, grams | 0.423 |
| He, cc. | 140 |
| Average temperature, ° F. | 1257 |
| Vapor contact time, sec. | 0.023 |
| Conversion | 74.9 |
| Products, wt. percent of charge |  |
| $C_4$ | 13.7 |
| $C_5$–$C_{12}$ | 45.3 |
| Coke | 0.2 |

The above example clearly illustrates a high degree of conversion with good selectivity towards gasoline at the extremely low cat./oil ratio of 0.02.

Examples 5–16

A hydrogen deficient Beaumont charge stock having the following composition:

13.6 weight percent Light Mid-Continent Gas Oil;
9.7 weight percent Light Coker Gas Oil;
37.2 Heavy Virgin Mid-Continent Gas Oil;
11.5 weight percent Heavy Coker Gas Oil;
28 weight percent of an overhead of a 1:1 ratio of T.C.C. heavy cycle stock and furfural extract was contacted with hydrogen under hydrogenation conditions until the total weight percent of hydrogen in the treated material was 12.27 and thereafter mixed with additional hydrogen, heated to 900° F. and thereafter charged into a reactor containing 0.0423 gram of the crystalline aluminosilicate employed in Example 4. Hydrogen was fed into the reactor at a flow rate of 140 cc. per minute and the average temperature of the reactor for all these experiments was approximately 1150° F. After conversion for various times the products were collected and analyzed. The results of the conversion as well as the specific operating conditions for each example are shown in Table 3.

TABLE 3

| Ex. No. | Charge rate, grams per minute | Avg. total dur. of contact, min. | LHSV | Conversion, wt. percent | Gasoline weight efficiency (1) | Gasoline volume efficiency (2) |
|---|---|---|---|---|---|---|
| 5 | .419 | 8 | 408 | 57.1 | 66.5 | 81.2 |
| 6 | .410 | 188 | 399 | 46.9 | 75.2 | 91.8 |
| 7 | .429 | 328 | 418 | 48.4 | 75.6 | 92.2 |
| 8 | .395 | 423 | 385 | 46.8 | 77.4 | 94.4 |
| 9 | .370 | 583 | 360 | 43.0 | 74.8 | 91.3 |
| 10 | .486 | 663 | 473 | 44.9 | 75.9 | 92.7 |
| 11 | .416 | 778 | 405 | 44.8 | 77.0 | 93.9 |
| 12 | .355 | 958 | 346 | 45.8 | 76.7 | 93.6 |
| 13 | .315 | 1,138 | 307 | 44.4 | 77.0 | 94.0 |
| 14 | .466 | 1,358 | 454 | 45.7 | 80.7 | 98.5 |
| 15 | .452 | 1,728 | 440 | 39.9 | 80.9 | 98.8 |
| 16 | .454 | 2,138 | 442 | 27.5 | 76.9 | 97.2 |

(1) $$\frac{\text{Wt. percent of Gasoline obtained}}{\text{Wt. of charge stock} - \text{Wt. of cycle stock}} \times 100$$

(2) $$\frac{\text{Volume of Gasoline}}{\text{Volume of charge stock} - \text{Volume of cycle stock}} \times 100$$

The data in Table 3 represent successive runs on the same catalyst without regeneration. As can be seen from the total duration of the catalyst contact of 2,130 minutes, the catalyst to oil ratio is 0.0423 divided by 2138×0.454 or about 0.00004. In the majority of operations cat./oil ratios of about one are considered extremely good so it can be seen that the process represented in Table 3 resulted in a catalyst which could do about 25,000 times more work than conventional operations.

In the above examples the coke found was so small that it could not be measured.

Examples 17-22

The procedure of Examples 5-16 was repeated with the exception that a hydrotreated Mid-Continent Gas Oil was employed instead of the Beaumont charge stock. The Mid-Continent Gas Oil was treated with hydrogen until the composition had a total hydrogen content of 13.59 wt. percent. The results as well as the specific operating conditions are shown in Table 4.

TABLE 4

| Ex. No. | Charge rate, grams per minute | Avg. total dur. of contact, min. | LHSV | Conversion, wt. percent | Gasoline weight efficiency | Gasoline volume efficiency |
|---|---|---|---|---|---|---|
| 17 | .429 | 8 | 418 | 79.4 | 59.3 | 72.4 |
| 18 | .429 | 188 | 418 | 57.5 | 67.0 | 81.8 |
| 19 | .413 | 603 | 402 | 51.6 | 70.9 | 86.6 |
| 20 | .435 | 963 | 424 | 44.1 | 73.3 | 89.5 |
| 21 | .446 | 1,143 | 434 | 36.9 | 73.3 | 89.5 |
| 22 | .426 | 1,413 | 415 | 34.0 | 75.3 | 91.8 |

The results of Examples 5 to 22 dramatically illustrate the novel process of this invention, for it can be seen that in prolonged periods of conversion substantially no coke was formed, whereas gasoline was obtained with good selectivity of extremely low cat./oil ratios.

Examples 23-24

The procedure of Examples 5-10 was repeated with the exception that .0366 gram of a crystalline aluminosilicate identified as ammonium treated Zeolite Y was employed. The ammonium Y aluminosilicate catalyst was prepared as follows:

Four pounds of a crystalline sodium aluminosilicate identified as Zeolite Y was contacted with 360 pounds of a 5% by weight aqueous $NH_4Cl$ solution at 180° F. The treated aluminosilicate was then washed with water until the effluent was substantially free of chloride ions.

The above material was dried at 230° F. and then contacted at 1000° F. for 90 minutes with steam at atmospheric presure at a flow rate of 4400 cc. of steam per minute.

The steamed material was contacted with a 1 Normal $NH_4Cl$ solution overnight at room temperature followed by filtering, washing, drying. The material was then refluxed at 216° F. with 2070 cc. of a 0.25 molar solution of ethylene diamine tetraacetic acid which had enough sodium hydroxide added to obtain a pH of 7.1.

The treated material was then washed with 2070 cc. of water and dried overnight at 230° F. to yield a material having the following analysis.

Wt. percent $SiO_2$ _____ 83.5
$Al_2O_3$ _____ 16.3
Na _____ 0.1

The results of the conversion as well as the specific operating conditions are set forth in Table 5 below.

TABLE 5

| Example No. | 23 | 24 |
|---|---|---|
| Charge rate, grams per min | .380 | 31.3 |
| Run duration, min | 8 | 213 |
| LHSV | 370 | 334 |
| Conversion, wt. percent | 43.7 | 31.5 |
| Coke wt | 0 | 0 |
| Gasoline wt. efficiency | 65.1 | 75.0 |
| Gasoline vol. efficiency | 79.5 | 91.5 |

Example 25

A synthetic crystalline aluminosilicate identified as Zeolite 13X was contacted with a Didymium chloride hexahydrate solution at 180° F. for a total of at least 8 separate contacts. The aluminosilicate was then washed with water until the effluent was substantially free of chloride ions, dried at 230° F. and then steamed for 24 hours at 1200° F. with 100% steam at 15 p.s.i.g. to yield a catalyst having an alpha value greater than 2.0.

A stream of Mid-Continent Gas Oil was preheated to 900° F. and thereafter charged into a reactor containing 0.0411 gram of the catalyst prepared above.

The reactor was maintained at an average temperature of 1136° F. and after a run duration of one minute the products were collected and analyzed. The results of the conversion as well as the specific operating conditions are shown in Table 6.

TABLE 6

| | |
|---|---|
| Volume of catalyst, cc. | 0.075 |
| Weight of catalyst, cc. | 0.0411 |
| Charge rate of Gas Oil, grams per minute | 2.14 |
| Average temperature, °F. | 1136 |
| Vapor contact time, sec. | 0.025 |
| Conversion, wt. percent | 34.0 |
| Products: | |
| Wt. percent of charge | |
| $C_4$ | 2.9 |
| $C_5$–$C_{12}$ | 27.9 |
| Coke | 0.3 |

The above example resulted in the production of gasoline at a good conversion at a cat./oil ratio of 0.02.

Example 26

A solution containing 20 weight percent of a crystalline aluminosilicate identified as Zeolite 13X was base exchanged with an aqueous solution of $RECl_3.6H_2O$ until the total exchange solution used was 1.98 pounds of $RECl_3.6H_2O$ per pound of 13X. After treatment with the rare earth chloride solution, the material was filtered, washed with water until the effluent was substantially free of chloride ions and then dried so as to obtain a rare earth aluminosilicate having a sodium content of 0.52 weight percent and a rare earth content, determined as rare earth oxides, of 27.7 weight percent.

A stream of Mid-Continent Gas Oil was preheated to 900° F. and thereafter charged into a reactor containing 0.0533 gram of the catalyst prepared above.

The reactor was maintained at an average temperature of 1148° F. and after a run duration of one-half minute the products were collected and analyzed. The results of the conversion as well as the specific operating conditions are shown in Table 7.

TABLE 7

| | |
|---|---|
| Volume of catalyst, cc. | 0.070 |
| Wt. of catalyst, cc. | 0.0533 |
| Charge rate of gas oil grams per minute | 2.16 |
| Average temperature, °F. | 1148 |
| Vapor contact time, sec. | 0.024 |
| Conversion, wt. percent | 41.2 |
| Products, wt. percent of charge: | |
| $C_4$ | 4.5 |
| $C_5$–$C_{12}$ | 29.8 |
| Coke, wt. percent | 0.9 |

Example 27

The procedure of Example 25 was repeated with the exception that slightly different experimental conditions were used. These conditions as well as the results obtained are shown in the following table.

TABLE 8

| | |
|---|---|
| Volume of catalyst, cc. | 0.070 |
| Weight of catalyst, cc. | 0.0414 |
| Charge rate of gas oil grams per minute | 2.15 |
| Average temperature, °F. | 1224 |
| Vapor contact time, sec. | 0.024 |
| Conversion, wt. percent | 53.9 |
| Products, wt. percent of charge: | |
| $C_4$ | 6.6 |
| $C_5$–$C_{12}$ | 37.1 |
| Coke, wt. percent | 1.2 |

What is claimed is:

1. In the catalytic cracking of a hydrocarbon oil to produce hydrocarbons of lower molecular weight, the improvement which comprises contacting said oil with a crystalline aluminosilicate cracking catalyst at temperatures and space velocities as set forth in FIGURE 1 and at a catalyst to oil ratio no higher than 0.1.

2. In tthe catalytic cracking of a hydrocarbon oil to produce hydrocarbons of lower molecular weight, the improvement which comprises contacting said oil with a crystalline aluminosilicate cracking catalyst at a temperature of 1100°–1350° F. and at a space velocity such that no more than 10 percent thermal cracking would occur if the catalyst were not present and at a catalyst to oil ratio no higher than 0.1.

3. In the catalytic cracking of a hydrocarbon oil to produce hydrocarbons of lower molecular weight the improvement which comprises contacting said oil at temperatures ranging from 1100° F. to about 1350° F. and at space velocities ranging from 32 to 1200 LHSV with a crystalline aluminosilicate catalyst having an $\alpha$ value of at least 0.5 and at catalyst to oil ratios no higher than 0.1.

4. The process of claim 3 wherein the catalyst has an $\alpha$ value of at least 3.0.

5. The process of claim 4 wherein the catalyst is a rare earth exchanged crystalline aluminosilicate.

6. The process of claim 4 wherein said hydrocarbon oil has a hydrogen content of at least 12.3 weight percent.

7. A process for the catalytic cracking of a hydrogen deficient gas oil to produce hydrocarbons of low molecular weight which comprises introducing a mixture of said gas oil and hydrogen into a hydrogenation zone maintained at hydrogenation conditions until the gas oil has a hydrogen content of at least 12.3 weight percent, passing the hydrogen-treated gas oil into a cracking zone containing a crystalline aluminosilicate cracking catalyst at a space velocity ranging from 32 to 1200 LHSV and maintaining said zone at temperatures ranging from 1100° F. to about 1350° F. at catalyst to oil ratios no higher than 0.1; whereby said gas oil is cracked into light products and heavy products and recycling said heavy products back to the hydrogenation zone.

References Cited

UNITED STATES PATENTS

| | | | |
|---|---|---|---|
| 3,098,029 | 7/1963 | Snyder | 208—57 |
| 3,278,416 | 10/1966 | Dwyer et al. | 208—87 |

DELBERT E. GANTZ, *Primary Examiner.*

G. E. SCHMITKONS, *Assistant Examiner.*

U.S. Cl. X.R.

208—89

UNITED STATES PATENT OFFICE
CERTIFICATE OF CORRECTION

Patent No. 3,420,770                    January 7, 1969

Nai Yuen Chen

It is certified that error appears in the above identified patent and that said Letters Patent are hereby corrected as shown below:

Column 3, line 17, "1350°°" should read -- 1350° --.
Column 6, line 22, "and/or or" should read -- and/or --.
Column 9, line 49, "presure" should read -- pressure --; line 70, "31.3" should read -- .343 --. Column 10, line 43, "effiuent" should read -- effluent --. Column 11, line 21, "tthe" should read -- the --.

Signed and sealed this 14th day of April 1970.

(SEAL)
Attest:

Edward M. Fletcher, Jr.              WILLIAM E. SCHUYLER, JR.
Attesting Officer                       Commissioner of Patents